United States Patent [19]

Riddle

[11] 4,310,914
[45] Jan. 12, 1982

[54] SKIPPER-ASSISTED ACTIVE SEARCH

[75] Inventor: George H. N. Riddle, Princeton, N.J.

[73] Assignee: RCA Corporation, New York, N.Y.

[21] Appl. No.: 85,870

[22] Filed: Oct. 18, 1979

[51] Int. Cl.³ .................. H04N 5/76; G11B 21/00; G11B 17/00
[52] U.S. Cl. .................. 369/43; 358/128.5; 369/126; 369/221; 360/10; 360/77
[58] Field of Search .................. 358/128.5, 128.6; 179/100.1 G, 100.1 B, 100.4 D, 100.4 M; 360/10, 77, 78, DIG. 1; 174/100.41 G; 274/9 R, 9 B, 13 R, 14, 15 R, 23 A; 369/221, 43, 126

[56] References Cited

U.S. PATENT DOCUMENTS

| | | | |
|---|---|---|---|
| 3,973,080 | 8/1976 | Dickozyre et al. | 358/128.5 |
| 4,183,059 | 1/1980 | Palmer | 179/100.4 D |
| 4,213,148 | 7/1980 | Clemens | 358/128.6 |
| 4,220,339 | 9/1980 | Coleman et al. | 358/128.5 |
| 4,262,174 | 4/1981 | Bleazey | 369/221 |

FOREIGN PATENT DOCUMENTS 1469483 4/1977 United Kingdom .

Primary Examiner—Raymond F. Cardillo, Jr.
Attorney, Agent, or Firm—E. M. Whitacre; J. S. Tripoli; E. P. Herrmann

[57] ABSTRACT

Apparatus in a video disc player for previewing or scanning information on a record disc. A position sensor detects the position of a playback stylus relative to the carriage assembly for translating the stylus radially across the disc. The position sensor output signals energize a stylus skipper mechanism to translate the stylus a prescribed number of information tracks in accordance with the stylus carriage bias exceeding a threshold value. The carriage is manually moved across the record with the sensor and skipper mechanism cooperating to translate the stylus in consonance with the carriage movement.

6 Claims, 5 Drawing Figures

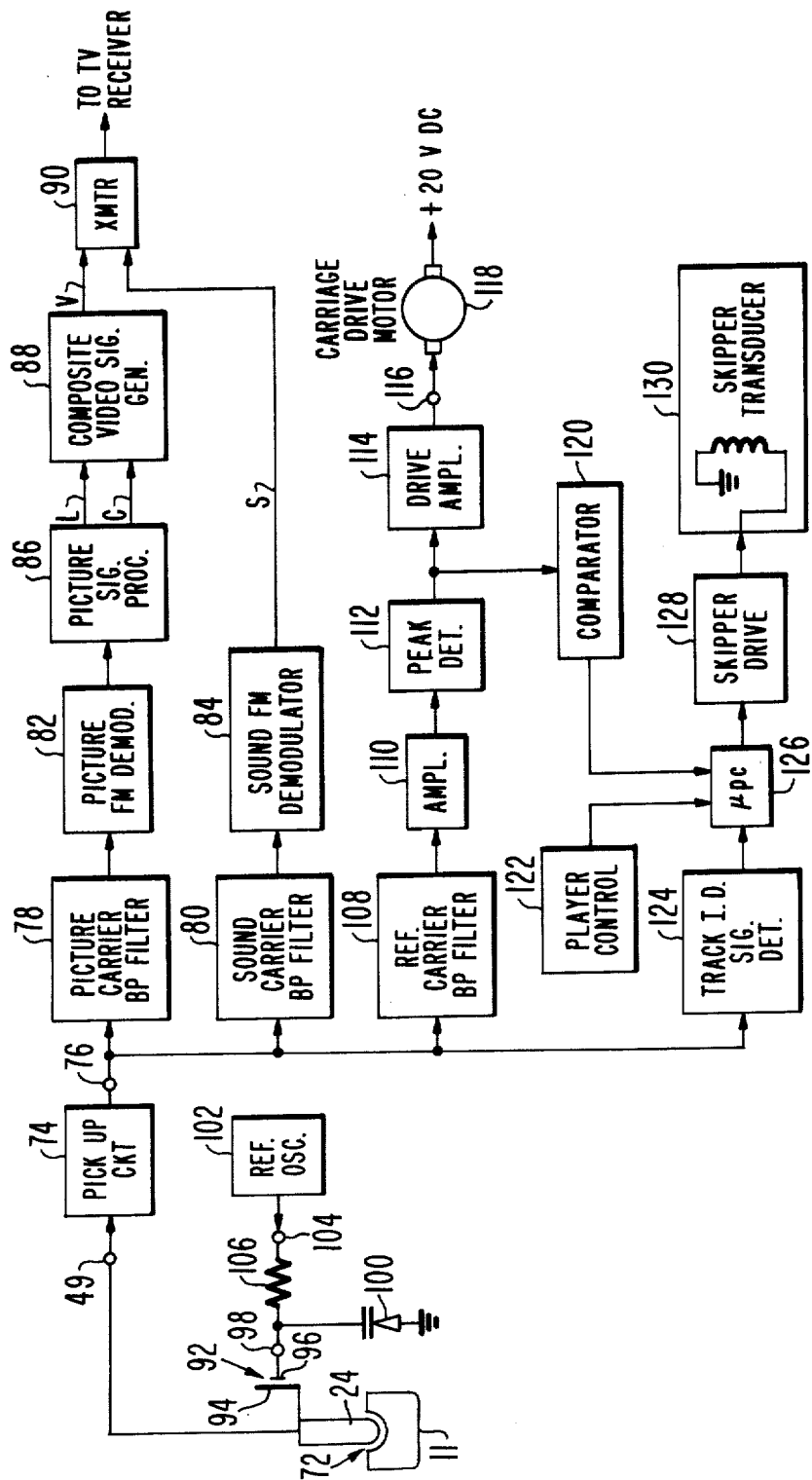

SKIPPER-ASSISTED ACTIVE SEARCH

This invention relates to video disc playback systems and in particular to a means for previewing record disc information in a relatively short time.

In certain video disc systems, information is prerecorded on record discs having information bearing tracks or spiral grooves. The information is recovered by a track-following stylus contoured to engage the track. The stylus is mounted to a stylus arm attached via a compliant coupling to a carriage assembly which is driven to translate the stylus radially across the disc. The compliant coupling permits limited relative motion between the stylus and the carriage assembly.

Typically, bumpers are affixed to the carriage and disposed on either side of the stylus arm to limit the degree of stylus-carriage relative motion. Early attempts to include a preview feature in the player for quickly scanning the contents of a record disc comprised a means for simply manually translating the carriage across the disc while the stylus engaged the disc and wherein the stylus arm engaged an outboard bumper fixed to the carriage assembly and forced the stylus across the tracks. Manual translation or scanning as used hereinafter refers to user controlled apparatus for overriding the normal carriage translation, inclusive of switch controlled electromechanical transducers. It was thought that because the record tracks or grooves are shallow, i.e., in the order of one micrometer, and the stylus pressure low, e.g., 60–100 mg., little or no damage to the record would occur. In fact, although this manual method of scanning does work, it has, on occasion, shown some tendency to damage the disc.

Disengaging the stylus from the disc and periodically engaging it with a stylus lifter mechanism while translating the carriage to minimize damage is unacceptable because too little information content is transmitted to the viewer during preview as well as creating an undesirable flicker in the display.

It has been demonstrated that a stylus can be translated across one or more disc grooves with little or no damage to the disc by a kicker mechanism as described in U.S. Pat. No. 3,993,863 entitled, "Disc Record Groove Skipper", or U.S. Patent Application Ser. No. 908,515 (now issued U.S. Pat. No. 4,183,059) filed May 22, 1978 by R. C. Palmer entitled, "Track Skipper for a Video Disc Player", which application is assigned to the same assignee as the present invention. The present invention utilizes this circumstance to effect a manual carriage translation for scanning purposes with minimal or no damage to the player stylus or record disc.

In the present invention manual means is provided for translating the carriage/stylus combination radially across the record disc, which manual means overrides the mechanism normally translating the carriage. The carriage/stylus combination includes a track skipper apparatus for imparting translatory motion to the stylus radially across the record disc and motion relative to the carriage. A position sensing apparatus senses the position of the stylus relative to the carriage. When the relative stylus-carriage position differs by a prescribed amount from their relaxed or quiescent relationship, circuitry drives the skipper mechanism tending to restore the stylus-carriage relationship to said relaxed state. In so doing, the stylus is translated radially across the record disc by the skipper at a velocity in consonance with the carriage motion.

In the drawings:

FIG. 5 is a block diagram of a record scanning/preview apparatus integrated in a player system.

Figure 1:
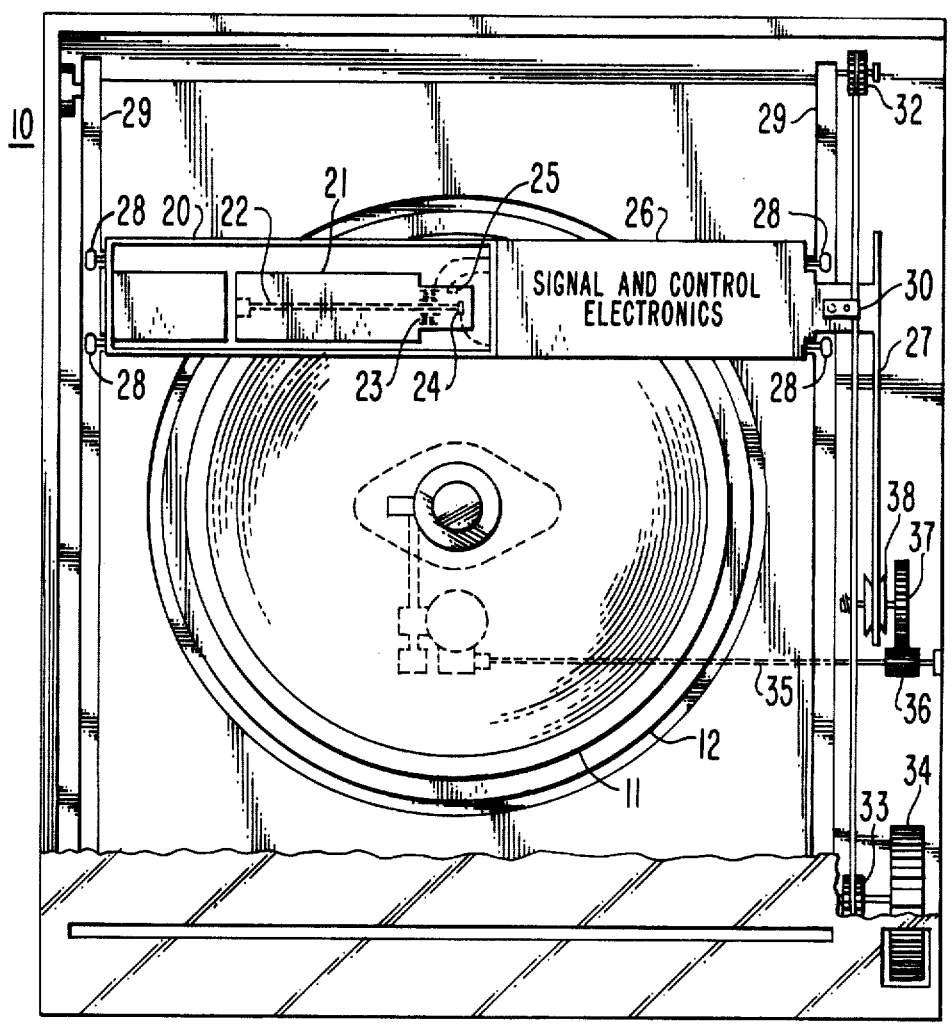
FIG. 1 is a diagrammatic representation of a video disc player incorporating a manual preview mechanism pursuant to the invention.

The video disc player 10 of FIG. 1 includes a groove following signal pickup stylus 24 mounted in a carriage assembly 20. The signal pickup stylus 24 is secured to a stylus arm 22 mounted via a compliant coupling to a removably mounted cartridge 21. A position sensor 25, fixedly mounted in the carriage 21 proximate the signal pickup stylus, is arranged for determining the relative position of the stylus. Mounted to the carriage and disposed on either side of stylus arm 22 are electromechanical transducer coils 23 for imparting translatory motion to a permanent magnet secured to the stylus arm 22 which motion is translated via the stylus arm to the signal pickup stylus 24. Signal and control circuitry 26 for processing recovered signal from the pickup stylus 24 and position sensor 25, as well as generating signals for driving transducer coils 23, is included in the carriage assembly. Carriage 20 having rollers 28 mounted thereon is constrained to traverse a predetermined path by the channels 29 so that the pickup stylus 24 traverses the record disc 11 along a substantially radial path. Provision is made for the signal pickup stylus 24 to selectively engage record disc 11 through an aperture in the bottom of carriage 20. Record disc 11 having information bearing tracks or a spiral groove thereon is rotated via turntable 12 to produce relative motion between the information track and the signal pickup stylus.

Motion is imparted to the carriage by virtue of friction between rotating split pulley 38 and the extension 27 of the carriage 20. Split pulley 38 is driven by the drive chain including shaft 35 and gears 36 and 37 connected to the prime mover which rotates turntable 12.

Thumbwheel 34 is coupled through pulley 33 to the endless cord 31. Endless cord 31, suspended between pulleys 32 and 33, is attached to carriage extension 27 by the clip 30. Rotation of thumbwheel 34, which is accessible from the front panel of the player, creates lineal motion in cord 31 and thereby a means for manually translating the carriage 20. Coupling between the cord 31 and thumbwheel 34 surpasses the frictional coupling between split pulley 38 and carriage extension 27 so that manual translation supersedes normal motor operated carriage translation.

In lieu of the thumbwheel, a motor driven apparatus, responsive to a scan control switch, may be implemented to controllably translate the carriage in an inward or outward direction for scanning the record at a speed different from the normal scanning rate. The use of such a motor driven apparatus would enable the user to scan the record at a uniform rate whereas scanning via the thumbwheel will tend to be at a less than uniform rate. Alternatively, the thumbwheel may be coupled to a motor to provide the combined option of manual scan and motor driven scan.

Figure 2:
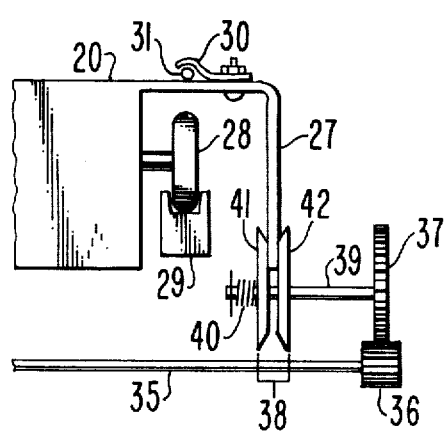
FIG. 2 is a diagrammatic representation of a mechanism for overriding the carriage drive mechanism.

The apparaus providing the frictional coupling to normally drive the carriage 20 is illustrated in FIG. 2. Carriage extension 27 is suspended between the halves 41 and 42 of the split pulley 38. The left most half 41 of the split pulley 38 is slidably mounted to shaft 39 which is rotated by virtue of the drive chain including shaft 35 and gears 36 and 37. Compression spring 40 constrained from leftward motion imparts rightward pressure on the left most half 41 of the pulley effectively squeezing the carriage extension 27 between both halves of the split pulley. Friction between the inside surfaces of the pulley halves 41 and 42 and the contacted surface of carriage extension 27 converts the rotation of shaft 39 to linear motion of the extension 27 and thereby causing linear translation of carriage 20.

Figure 3:
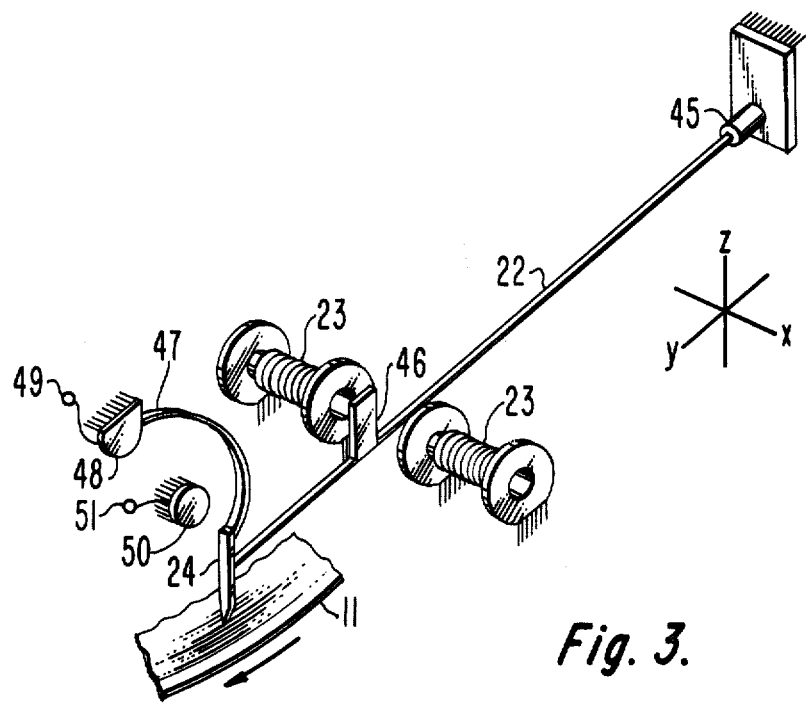
FIG. 3 is a schematic representation of a stylus skipper mechanism.

A particular stylus/stylus arm-skipper arrangement is illustrated in the FIG. 3. Stylus 24 is fixedly mounted at the free end of stylus arm 22, the other end of which is coupled to a cartridge or carriage assembly (not shown) by compliant coupling 45 permitting limited movement of the stylus relative to the cartridge/carriage in the three dimensions shown. A permanent magnet 46 is secured to stylus arm 22, disposed between selectively energized coils 23. Coils 23, mounted to the cartridge/carriage assembly, have non-magnetic cores and are connected to produce aiding magnetic fields therebetween when energized. Selectively energizing the coils in a particular polarity with a particular drive pulse to generate a magnetic field of a particular strength will create a prescribed translation of the magnet 46 and thereby translation of stylus 24 along the "x" axis.

Electrical connection is made to the pickup stylus 24 through metallic flylead 47 secured to the cartridge/carriage assembly by ball 48 having a connection 49. An electrode 50 mounted to the cartridge/carriage assembly proximate the flylead and having electrical connection 51 forms a capacitor with flylead 47. The value of the capacitance varies in accordance with the spacing between flylead 47 and electrode 50 which varies proportional to the "x" directed movement of the stylus relative to the cartridge/carriage assembly. Sensing the relative value of capacitance relative to a non-mechanically biased position of the stylus provides an indication of the relative position of the stylus with respect to the carriage. A stylus position sensing apparatus useful for detecting this relative capacitance is more fully described in U.S. patent application Ser. No. 055,648 filed July 9, 1979 by B. K. Taylor entitled, "Video Disc Player Having Stylus Position Sensing Apparatus" (now abandoned in favor of application Ser. No. 251,571 filed Apr. 6, 1981) and assigned to the common assignee of the present invention.

Figure 4:
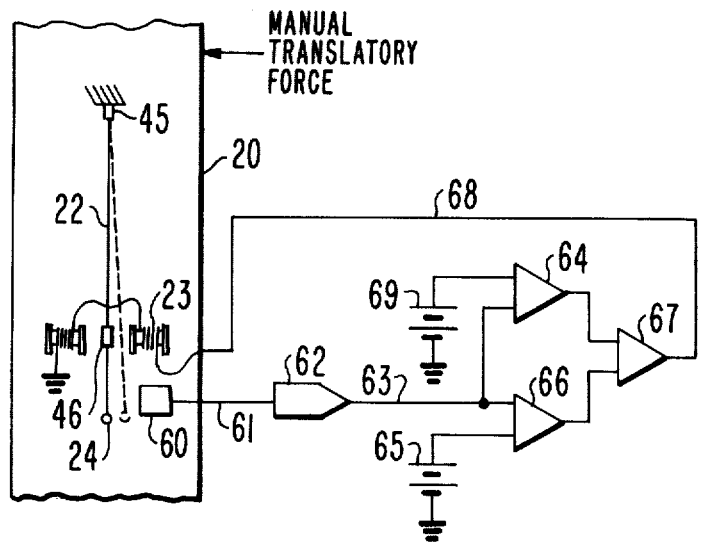
FIG. 4 is a schematic representation of a record scanning/preview apparatus embodying the present invention.

Considering FIG. 4, carriage 20 has a stylus 24 and a stylus arm 22 compliantly coupled (45) to the carriage for providing relative motion between the stylus 24 and the carriage 20. Included in the stylus-carriage arrangement are a stylus position detector 60 and a stylus skipper transducer (coils 23 and magnet 46). The skipper transducer is driven by drive circuitry 67 which generates a signal having the waveshape, amplitude and duration appropriate to energize the transducer to produce the desired degree and direction of stylus translation.

Position ddetector 60 generates a signal at connection 61 proportional to the relative position of the stylus 24 with respect to the detector and thereby the carriage. This signal is amplified and conditioned by circuitry 62 producing a potential at connection 63. The potential at connection 63 is applied to a first input connection of a comparator 66, where it is compared with a reference potential 65 applied to a second input connection of comparator 66. Upon the condition that the potential at connection 63 exceeds the reference potential, comparator 66 generates a control signal to condition drive circuit 67 to apply an energization pulse to the skipper transducer. The reference potential is adjusted so as to provide the desired degree of stylus-carriage movement required before a skipper-induced stylus translation is initiated.

Since it is desirable to be able to scan a record both forward and backward, provision is made to compare the detector signal for a mechanically biased stylus in either direction from its relaxed position. For the system as shown in FIG. 4 wherein the carriage is moved in the direction of the "FORCE" arrow, the stylus is biased toward the detector and the detector signal increases. Alternatively, if the carriage is moved in the opposite direction the stylus is biased away from the detector and the detector signal decreases. A second comparator 64 with a second reference source 69 is included to respond to the potential at connection 63 decreasing below the value of reference source 69. The output signal from the comparator 64 is applied to skipper drive circuit 67 to generate a drive pulse for producing stylus translation direction opposite the translation initiated by comparator 66.

FIG. 5 is a block diagram representation of player electronics including circuitry for a stylus position sensing apparatus for controlling a servo motor drive for the carriage mechanism and controlling a stylus skipper mechanism. The circuitry employed to recover FM signals recorded on the disc will be explained first. As shown in FIG. 5, the terminal 49 of the pickup circuit 74 is coupled to the conductive stylus 24. The pickup circuit, responsive to variations in the signal representative capacitance 72 formed between the stylus 24 and the record 11, provided at the output terminal 76 thereof audio and video signals recorded on the disc. Reference may be made to U.S. patents issued to Carlson, et al. (U.S. Pat. No. 3,872,240) and Kawamoto, et al. (No. 4,080,625) for descriptions of illustrative pickup circuits. The output of the pickup circuit 74 is delivered to a pair of bandpass filters 78 and 80. The picture carrier bandpass filter 78 has a relatively wide bandpass encompassing the deviation range of the high frequency picture carrier (e.g., 4.3 to 6.3 MHz) as well as the requisite adjacent sideband regions, and selectively passes the picture carrier component of the recorded signal to the relative exclusion of the sound carrier component thereof. The sound carrier bandpass filter 80 has a relatively narrow passband encompassing the deviation range of the low frequency sound carrier (e.g., 716 KHz±55 KHz) as well as the requisite adjacent sideband regions, and selectively passes the sound carrier component of the recorded signal to the relative exclusion of the picture carrier component thereof.

The outputs of the respective bandpass filters 78 and 80 are passed to respective demodulators 82 and 84. The picture demodulator 82 develops at its output terminal the picture signal information inclusive of synchronizing components, and the sound demodulator 84 develops at its output terminal the audio signal information.

A picture signal processor 86, coupled to the picture demodulator, effects the separation of the chrominance information from the luminance information. A composite video signal generaor 88 recombines the chrominance and the luminance information in accordance with, for example, the NTSC format. A transmitter circuit 90 processes the sound, luminance and the chrominance information to form a signal suitable for delivery to a conventional color TV receiver, wherein color image displays may be developed in accordance with the recorded information.

The signal pickup circuit 74 also serves to sense the variations in the stylus position indicative capacitance 92. Oscillator 102 generates a 260 KHz signal applied to terminal 98 and thereby one plate of variable capacitor 92. The 260 KHz signal is coupled via capacitor 92 to the pickup circuit 74, the signal having an amplitude which varies inversely with the spacing between the position sensing electrodes 94 and 96. This signal is separated from the rest of the signals appearing at the output terminal 76 of the pickup circuit by a bandpass filter 108 coupled thereto. The bandpass filter has a passband encompassing the requisite deviation range of the 260 KHz reference carrier. The separated 260 KHz signals are amplified by an ampifier 110. A peak detector 112, coupled to the amplifier 110, generates a signal at the output thereof which represents the relative position of the pickup stylus 20 with respect to the arm carriage 44. The peak detector output signal is supplied to the driver amplifier 114 which generates at the output terminal 116 theeof an error correction signal suitable for application to the motor 118, which drives the carriage. The amplitude of the signal applied to the carriage motor is such that the spacing between the stylus and the carriage is maintained at a predetermined optimum level.

Further circuitry for recognizing anomalous radial translation of the stylus across the record disc or for generating stop motion or special effects is included. Circuit 124 separates track identification signals included in the signal blanking intervals of the recorded information from the audio and video signal components. The track identification signals are applied to microprocessor 126 which is programmed by player control 122 to insure normal track progression of the stylus in consonance with the desired operation of the player. For example, the player may be programmed to "freeze" the image appearing on a particular track for a prescribed duration. In this instance, when the stylus encounters the particular track in its normal progression across the record disc the microprocessor generates a signal which is applied to the skipper drive to condition the skipper transducer to return the stylus to the beginning of the particular track a prescribed number of times thereby causing the replay of that track's information and effectively freezing the TV picture.

The preview feature is added to the system by providing the means for manual translation of the carriage assembly and addition of comparator 120 to the position sense circuit. The threshold values of the comparator are set outside the range of anticipated stylus bias for normal play modes to inhibit the comparator from generating output signals except in the instance of manual scanning. The output signal of the comparator is applied to the microprocessor which directs the microprocessor to create a prescribed stylus skipper induced stylus translation.

The output signal from the comparator 120 may just as well be applied directly to the skipper drive circuit 128 with the requisite direction of skip established by a scan direction switch.

Armed with the foregoing one skilled in the art of playback systems will readily devise variations without straying from the spirit of the invention. For example, the skipper transducer may be substituted with a bimorph integrally included in the stylus arm to provide "x" directed stylus deflections, responsive to skpper signals or the position detector may be realized using photo-diodes and photo-detectors. The particular embodiments are included by way of example and the claims should be construed in this light.

What is claimed is:

1. In a system for recovering prerecorded signals from a disc record having information recorded along a track disposed on the surface thereof by means of a track-following stylus which engages the disc record, said stylus movably mounted via a stylus arm on a carriage assembly and having a drive means for translating said carriage assembly and track-following stylus radially across the disc during normal playback, the combination for scanning the recorded information at a rate differing from normal playback comprising:

means for translating the carriage assembly in a scanning mode, said means subordinating the translatory motion imparted by said drive means;

detection means responsive to the relative position between the stylus arm and thereby the track-following stylus and the carriage assembly for producing an electrical signal related to said relative position;

motive means responsive to said electrical signal for translating the stylus relative to the carriage assembly in a direction to restore the stylus-carriage positional relationship to a desired condition and thereby maintaining the average radial velocity of the stylus substantially equal to the carriage assembly velocity when the carriage is translated in said scanning mode.

2. The combination as set forth in claim 1 wherein the detection means comprises:

a capacitor having a first plate fixedly attached to the carriage assembly and a second plate mounted to move in general conformance with the tracking stylus;

means for applying an AC signal to the first capacitor plate;

amplifier means having an input terminal connected to the second plate of said capacitor and having an output terminal, responsive to the AC signal applied to said first plate for generating an output signal at said output terminal in accordance with the spacing between said first and second plates of said capacitor;

rectifying means for converting said output signal to a potential of single polarity;

comparator means responsive to the single polarity potential exceeding a prescribed threshold for producing said electrical signal.

3. The combination as set forth in claim 1 wherein the motive means comprises:

a permanent magnet secured to said stylus arm near the track followng stylus;

a pair of spaced coils having non-magnetic cores for providing a magnetic field therebetween upon application of said further signal thereto; and means for mounting said pair of coils in fixed relation to said carriage assembly such that at least one pole of said permanent magnet is disposed therebetween.

4. The combination as set forth in claim 1 wherein the means for translating said carriage assembly comprises:

an endless cord disposed about a pair of pulleys;
means attaching said core to the carriage assembly;
and means for coupling tactile motion to said cord.

5. The combination as set forth in claim 4 wherein the means for coupling tactile motion is a thumbwheel.

6. In combination with a video disc playback system including a track following stylus secured to a first end of a stylus arm, the second end thereof mounted via a compliant coupling to a carriage assembly for radially translating the track following stylus across said video disc, said track-following stylus across said video disc, said track-following stylus having electrical connection to the carriage assembly by a conductive flylead arranged substantially in plane formed by the intersection of the stylus and stylus arm, an information preview mechanism comprising:

an electrode secured to the carriage assembly in proximity to said flylead to form a variable capacitance therewith;

means for sensing the relative value of said capacitance and thereby the relative spacing between the electrode and the flylead, the sensing means generating an electrical signal relative to said spacing;

comparator means responsive to said electrical signal exceeding prescribed thresholds for selectively generating drive signals;

motive means responsive to said drive signals to impart prescribed translatory motion to said track following stylus radially across the video disc; and means for controllably effecting carriage assembly translatory motion radially across said disc.

* * * * *